United States Patent [19]

Hayashi et al.

[11] Patent Number: 4,913,276
[45] Date of Patent: Apr. 3, 1990

[54] CLUTCH RELEASING APPARATUS

[75] Inventors: Yoshitaka Hayashi; Toshiharu Honda, both of Fujisawa, Japan

[73] Assignee: Nippon Seiko Kabushiki Kaisha, Tokyo, Japan

[21] Appl. No.: 207,784

[22] Filed: Jun. 17, 1988

[30] Foreign Application Priority Data

Jun. 27, 1987 [JP] Japan .................................. 62-158815

[51] Int. Cl.[4] ............................................. F16D 25/08
[52] U.S. Cl. ................................ 192/85 CA; 192/91 A; 192/98
[58] Field of Search ................. 192/70.13, 85 CA, 98, 192/110 B, DIG. 1, 91 A, 109 R

[56] References Cited

U.S. PATENT DOCUMENTS

| 3,920,107 | 11/1975 | Limbacher | 192/98 |
| 4,561,531 | 12/1985 | Young et al. | 192/85 CA |
| 4,585,109 | 4/1986 | Shirley et al. | 192/85 CA |
| 4,601,374 | 7/1986 | Ladin | 192/98 |
| 4,606,449 | 8/1986 | Lederman | 192/85 CA |

Primary Examiner—Kenneth J. Dorner
Assistant Examiner—Brian K. Green
Attorney, Agent, or Firm—Shapiro and Shapiro

[57] ABSTRACT

A clutch releasing apparatus comprises a clutch releasing bearing assembly including a clutch release bearing and a holder therefor. A support member of the holder is supported on a bearing support mechanism, and a separation prevention arrangement is provided such that the support member may be fitted on the support mechanism with a relatively small force, but necessitating a relatively large predetermined force to remove the support member from the support mechanism.

12 Claims, 3 Drawing Sheets

CLUTCH RELEASING APPARATUS

BACKGROUND OF THE INVENTION

1. Field of the Invention

The present invention relates to a hydraulically operated clutch releasing apparatus, and more particularly, it relates to a self-aligning clutch releasing apparatus in which a clutch releasing bearing and its support are easily disassembled from one another.

2. Related Background Art

In general, clutch releasing apparatuses of this kind include a clutch releasing bearing on a sleeve that is axially slidably mounted on an input shaft protruding from a transmission. Either an inner race or an outer race of the bearing is rotatable, and the rotatable race of the bearing is urged against a torque transmitting member such as a diaphragm spring or a pawl of a clutch device to perform a releasing operation of the clutch.

A self-aligning mechanism may be provided, because it is very difficult to arrange a rotational axis of the clutch releasing bearing and the rotational axis of an associated flywheel along a common straight line, due to differences in accuracy of parts and/or in assembling accuracy. Without a self-aligning mechanism, there is a fair chance of deviation or eccentricity of the rotational axis of the clutch releasing bearing with respect to the rotational axis of the flywheel.

Misalignment of the axes produces an abnormal slip or skidding between the contact surfaces of the torque transmitting member of the clutch device and the clutch releasing bearing. This results in abnormal wear between these contact surfaces, noise, vibration and the like, and deterioration of the clutching operation. Thus, the clutch releasing apparatus develops an uncomfortable feel and has a reduced service life.

Japanese Utility Model Laid-Open No. 61 154329 has proposed a hydraulically operated clutch releasing apparatus wherein a clutch releasing bearing means is mounted on a bearing supporting member with a certain play such that the bearing means can be radially shifted with respect to the bearing supporting member. When the clutch releasing bearing means is rotated while engaging the diaphragm, the bearing means is shifted, by a centripetal force acting on the bearing means, to a position where the rotational axis of the bearing means is aligned with the rotational axis of the flywheel. The aligned clutch releasing bearing means is fixed with respect to the sleeve by a frictional spring force.

In this apparatus, when the clutch releasing operation is completed and then the clutch engaging operation is effected, the case including the bearing means is often rotated around the input shaft of the transmission due to frictional force or vibration acting on the bearing means.

Therefore, when the clutch releasing apparatus is activated again, the aligning operation is also effected again. This increases the wear in the contact portions of the clutch device and the clutch releasing apparatus, thus reducing the service life of the clutch device and/or the clutch releasing apparatus.

Further, when the bearing is to be replaced by a new one (for example, when the bearing has reached its service life after longterm use thereof), since the clutch releasing bearing means is integrally fixed to its supporting means, the whole clutch releasing apparatus must be disassembled. This involves disassembling the and reassembling hydraulic lines supplying the operating oil, and the procedures required are very time consuming.

OBJECT AND SUMMARY OF THE INVENTION

An object of the present invention is to provide a clutch releasing apparatus which improves service life by reducing the wear in the contact portions of the clutch device and the clutch releasing apparatus and which substantially reduces the time required for the disassembling and reassembling operations.

According to the present invention, the hydraulically operated clutch releasing apparatus has rotation preventing means for preventing relative rotational movement between a bearing holding means and a fixed member of the hydraulic device, thus preventing a relative rotational movement between the bearing means and the clutch device.

Further, in the clutch releasing apparatus according to the present invention, the clutch releasing bearing means and the bearing supporting means are interconnected to each other by separation preventing means. The separation preventing means allows the bearing means and the bearing supporting means to disconnect by application of a force larger than a predetermined value to the separation preventing means, thus facilitating the bearing replacing operation.

In the present invention, the bearing is pressed against a bearing supporting member by means of an elastic element, whereby after the bearing has been shifted so as to align the rotational axis of the bearing with the rotational axis of the flywheel during the initial clutch releasing operation (i.e., once a first aligning operation has been completed), the aligned position is always maintained. Further, by preventing the relative rotational movement between the clutch releasing bearing means and the clutch device by means of the separation preventing means having the above-mentioned construction, even after the releasing operation has been completed, the aligned condition is maintained. Accordingly, when the clutch releasing operations are repeated, repeated aligning operations are not required.

Further, in the clutch releasing apparatus according to the present invention, the clutch releasing bearing means can easily be separated from the bearing supporting means, thus permitting easy replacement of the clutch releasing bearing means.

DETAILED DESCRIPTION OF PREFERRED EMBODIMENT

Figure 1:
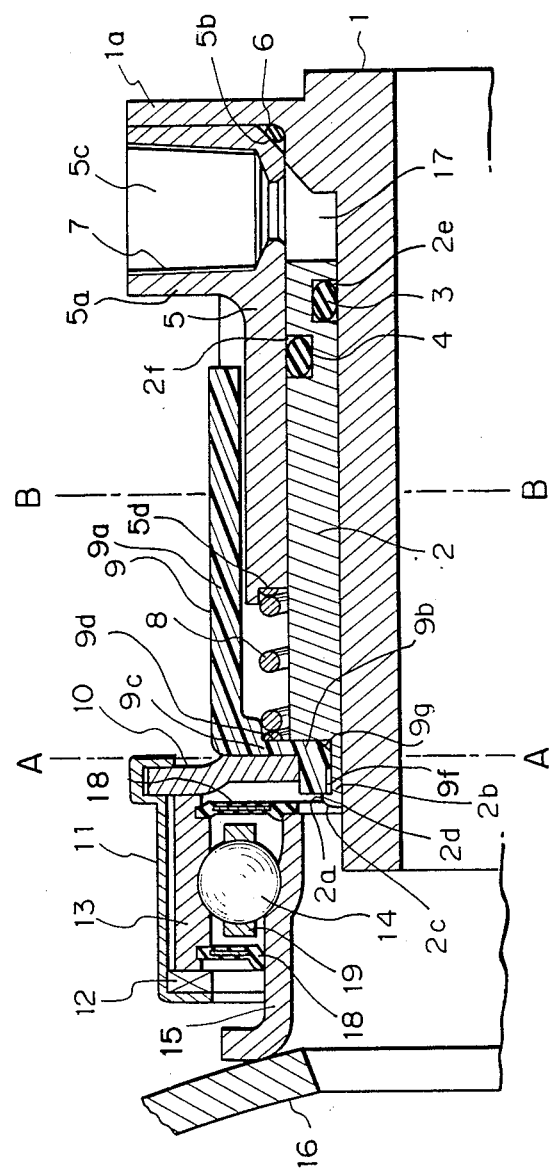
FIG. 1 is a partial sectional view of a clutch releasing apparatus according to the present invention in a rest position.

The present invention will now be explained with reference to a preferred embodiment illustrated in the drawings.

FIG. 1 is a partial sectional view of a clutch releasing apparatus according to the present invention.

An inner tubular cylinder 1, into which a clutch 5 shaft (not shown) is extended, is provided at its one end with a circumferential flange 1a. A cylindrical piston 2 is slidably mounted around the inner cylinder 1 in such a manner that an inner surface of the piston is closely contacted with an outer surface of the cylinder. The piston 2 has an axial length shorter than that of the cylinder 1 and is movable in an axial direction with respect to the cylinder. The piston 2 is provided at one end with a thin wall portion 2b having a uniformly reduced outer diameter, and with a bead 2a at a free end of the thin wall portion 2b. Further, an outer circumferential edge of the bead 2a is chamfered at 2c, and an axial inner face of the bead constitutes a flat side wall 2d perpendicular to the piston axis. A sleeve 9 to be described later is fitted over the piston 2 and retained by bead 2a.

At the other end of the piston 2, annular grooves 2e and 2f are formed on inner and outer cylindrical surfaces of the piston, respectively, into which O-rings 3 and 4 as conventional fluid sealing means are received, respectively. An outer cylinder 5 having an axial length shorter than that of the piston 2 is slidably mounted around the piston with its inner cylindrical surface closely contacted with the outer cylindrical surface of the piston 2. The outer cylinder 5 is provided at one end with a flange 5a which is engaged by the flange 1a of the inner cylinder 1 and is fixed to the flange 1a by means of suitable connecting means (not shown) such as bolts and the like. Further, an inner peripheral edge of the flange 5a has a relatively large chamfered portion 5b to define a chamber between this chamfered portion and the inner cylinder 1 when the flange 5a is abutted against the flange 1a of the inner cylinder 1. An O-ring 6 is arranged in the chamber. A fluid-tight operating oil chamber is thus formed between the inner cylinder 1, piston 2 and the outer cylinder 5.

In the flange 5a of the outer cylinder 5, there is provided a passage 5c which extends through the flange from its outer periphery to its inner periphery. The passage has an internal thread 7 for connecting an operating oil supply conduit to the flange 5a. Further, an annular recess 5d is formed in the other end of the outer cylinder 5 along the inner periphery thereof, which recess act as a seat for receiving one end of a coil spring 8.

The aforementioned cylindrical sleeve 9 has a length shorter than that of the piston 2 and is arranged around the outer cylinder 5 with a small clearance between the outer peripheral surface of the outer cylinder 5 and an inner peripheral surface of the sleeve 9. The sleeve 9 acts as a bearing supporting means and also as a sealing cover for the outer cylinder to prevent dust from entering into the inside of the apparatus through a clearance between the sleeve 9 and the outer cylinder 5.

The sleeve 9 comprises a larger cylindrical portion 9a, a smaller cylindrical portion 9b coaxial with the larger cylindrical portion, and a connecting side wall portion 9c connecting one end of the larger cylindrical portion 9a to one end of the smaller cylindrical portion 9b in a radial direction. The side wall 9c is integral with the larger and smaller cylindrical portions 9a, 9b along their whole inner and outer peripheral surfaces, respectively. A continuous annular recess 9d is formed in side wall 9c opposite the annular recess 5d of the outer cylinder 5 and receives a corresponding end of spring 8.

Figure 3:
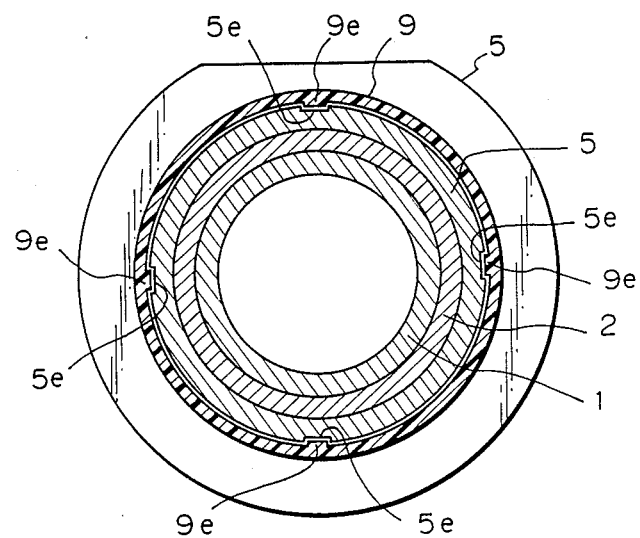
FIG. 3 is a full cross-sectional view of the apparatus taken along the plane B—B of FIG. 1.

On the outer peripheral surface of the outer cylinder 5, there are provided four axial keyways 5e (see FIG. 3) each of which extends from the flange 5a to the other end of the outer cylinder. Further, four axial projections or keys 9e (see FIG. 3) are formed on the inner peripheral surface of the larger portion 9a of the sleeve 9, these keys being engaged in the corresponding keyways 5e with a slight clearance therebetween. Therefore, the sleeve 9 can move along the outer cylinder 5 in the axial direction, but cannot rotate with respect to the outer cylinder.

The axial length and diameter of the smaller cylindrical portion 9b are so selected that the smaller cylindrical portion fits tightly over the thin wall portion 2b of the piston 2 with no axial or radial play. In the inner peripheral surface of the free end of the smaller cylindrical portion 9b, an annular recess 9f is formed to provide an enlarged inner diameter of the smaller cylindrical portion through a predetermined axial extent from the free end thereof. The inner peripheral edge of the smaller cylindrical portion remote from the free end is chamfered at 9g. Further, as shown in FIG. 4, a continuous annular projection 9h is formed on an outer peripheral surface of the free end of the smaller cylindrical portion 9b.

When the smaller cylindrical portion 9b is fitted on the thin wall portion 2b of the piston 2, the whole inner peripheral surface of the smaller cylindrical portion, except the annular recess 9f and the chamfered portion 9g, is abutted against the outer peripheral surface of the thin wall portion 2b. With the presence of the annular recess 9f, and since the sleeve 9 is made from a resin material, when the free end portion of the smaller cylindrical portion is subjected to a radial inward force, it can be easily flexed or deflected inwardly due to its own elasticity. Further, the chamfered portion 9g ensures that the smaller cylindrical portion 9b is correctly abutted against the thin wall portion 2b even if the outer cylindrical surface of the thin wall portion, particularly the corner thereof, is roughly machined.

Figure 2:
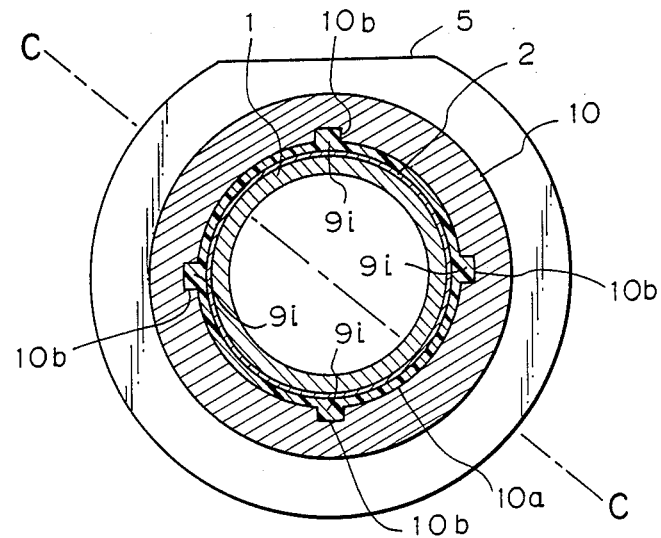
FIG. 2 is a full cross-sectional view of the apparatus taken along the plane A—A of FIG. 1.

A bearing supporting member 10 which constitutes a part of a bearing holding means is coaxially and removably mounted on the outer peripheral surface of the smaller cylindrical portion 9b of the sleeve 9 in a manner described hereinafter. The bearing supporting member 10 comprises a disc-like plate having a central portion and a peripheral portion axially offset with respect to the central portion. The bearing supporting member 10 has a central circular opening 10a (see FIG. 2), an inner diameter of which is so selected that when the member 10 is mounted on the smaller cylindrical portion 9b, an inner cylindrical wall defining the opening 10a engages by the outer cylindrical wall of the smaller cylindrical portion without any axial or radial play therebetween. Further, the axial thickness of the bearing supporting member 10 is substantially equal to the axial length of the smaller cylindrical portion 2b, excluding the projection 9h thereof. The bearing supporting member 10 has four axial keyways 10b (see FIG. 2), and the smaller cylindrical portion 2b of the sleeve 9 is provided at its outer cylindrical surface with four axial keys 9i (see FIG. 2) respectively received in the four keyways 10b of the bearing supporting member 10. Therefore, the member 10 cannot rotate with respect to the smaller cylindrical portion. The supporting member 10 and a position maintaining spring 12 cooperate with a case 11 of the bearing to hold an outer race 13 of the bearing in such a manner that the outer race 13 can be moved radially. The bearing includes balls 14, an inner race 15, a sealing element 18 and a holder 19, in addition to the above-mentioned outer race 13 and case 11. The inner race 15 of the bearing has one end extending axially beyond the case 11 and abutting against a diaphragm spring 16 (only a part of which is shown in FIG. 1) of a clutch device.

Figure 4:
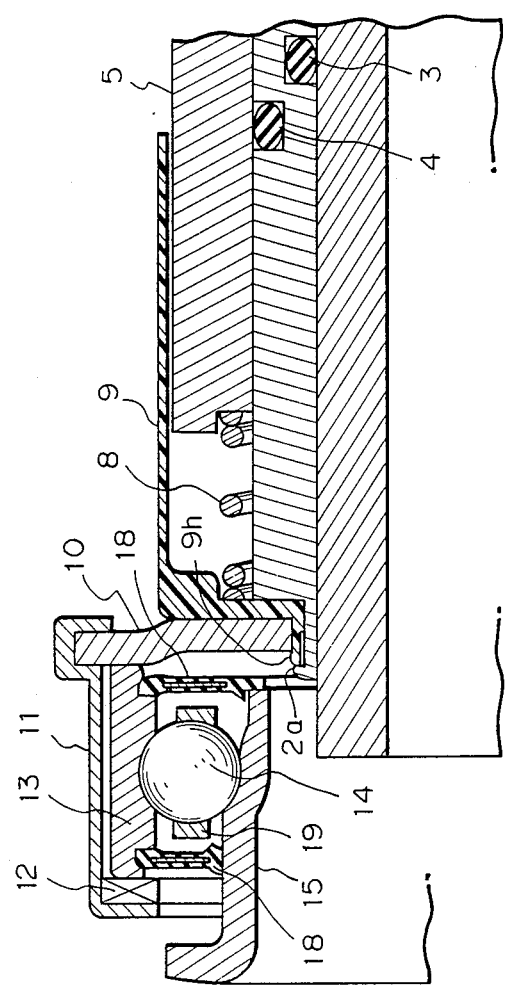
FIG. 4 is a partial sectional view of the apparatus taken along the plane C—C of FIG. 2.

FIG. 4 shows the engagement between the bearing supporting member 10 and the sleeve 9 outside the regions of keys/keyways engagement. When the supporting member 10 is mounted on the smaller cylindrical portion 9b of the sleeve 9, the member 10 is stably maintained in place due to the annular projection 9h. Bearing supporting member 10 is easily removed from the smaller cylindrical portion 9b of the sleeve 9, since the projection 9h can easily be deflected radially inwardly due to the elasticity of the sleeve 9 (because of the presence of the annular recess 9f).

Next, with respect to the illustrated embodiment, operation of the clutch releasing apparatus will be explained.

FIG. 1 shows the clutch releasing apparatus in an inoperative position. The operating oil supply conduit (not shown) is threadedly and sealingly connected to the threaded portion 7 of the outer cylinder 5, and the operating oil is filled in the operating oil chamber 17 defined by the inner cylinder 1, piston 2 and outer cylinder 5.

When an operator steps on a clutch pedal (not shown), pressurized operating oil from a source of the operating oil (not shown) is sent to the operating oil chamber 17 through the operating oil supply conduit, thus increasing the pressure in the chamber. Consequently, the piston 2 is shifted (leftward in FIG. 1) towards the clutch (not shown). The piston 2 moves the bearing via the sleeve 9 and the bearing supporting member 10, with the result that the clutch is shifted to the clutch release condition by force of the inner race 15 of the bearing against the diaphragm spring 16. When the clutch pedal is returned to its original position, the piston 2 is also returned to its original position, thereby completing the clutch releasing operation.

In the first clutch releasing operation after the clutch releasing apparatus according to the present invention is installed (or reinstalled), the rotational axis of the bearing can be aligned with a rotational axis of a flywheel (not shown) by a centripetal force acting on the inner race 15 and generated by the rotation of the inner race 15 after it abuts against the diaphragm spring 16 (i.e., the self-aligning or centering operation is effected). After the centering operation has been completed, the centered-position maintaining spring 12 urges the outer race 13 of the bearing against the bearing supporting member 10 to hold the outer race in the centered position. The self-aligning apparatus for the bearing may be a conventional one; thus, a detailed explanation of the self-aligning apparatus is unnecessary.

As is apparent from the above description, in the clutch releasing apparatus according to the present invention, any external force generated upon the clutch releasing operation and tending to rotate the bearing means is opposed by the engagement between the keyways 10b of the bearing supporting member 10 and the keys 9i of the sleeve 9, and by the engagement between the keys 9e of the sleeve 9 and the keyways 5e of the outer cylinder 5. The keys and keyways thus prevent rotation of the bearing and bearing supporting member 10. Consequently, the centered position obtained by the self-aligning operation upon the first clutch releasing operation is always maintained.

Further, in the clutch releasing apparatus according to the present invention, the bearing supporting member 10 is securely connected to the smaller cylindrical portion 9b of the sleeve 9, but easily removed to permit replacement of the bearing. When it is desired to replace the bearing, the bearing supporting member 10 can be removed from the sleeve 9 by separating the clutch device from the bearing and then simply applying a force to the member 10 in a direction axially away from the sleeve 9. As mentioned above, since the sleeve 9 is made from a resin material, the smaller cylindrical portion 9b of the sleeve 9 and, accordingly, the projection 9h formed thereon can be deflected inwardly until the smaller cylindrical portion abuts against the piston 2. Therefore, the bearing supporting member 10 can easily be separated from the sleeve 9.

It should be noted that the present invention is not limited to the illustrated embodiment and that various changes and modifications can be adopted without departing from the scope of the present invention. For example, in place of the keyways 5e, keys may be formed on the outer cylinder 5, and, correspondingly, in place of the keys 9e, keyways cooperating with the keys of the outer cylinder may be formed in the sleeve 9. Similarly, in place of the keyways 10b and the keys 9i, keys and keyways may be formed on the bearing supporting member 10 and the sleeve 9, respectively. Further, the number of keys and keyways is not limited to four and may be more or less in any given design.

Furthermore, the bearing held by the bearing holding means need not necessarily be supported to permit the self-aligning operation as in the illustrated embodiment, but can be fixedly supported. In this case, the centered position maintaining spring 12 may be omitted. In an apparatus wherein the bearing is not supported for self-aligning operation, it is not necessary to provide means for preventing the relative rotation between the bearing supporting means (supporting member) and the fixed member. Further, the sleeve 9 is not limited to a resin material.

As described above, in the hydraulically operated clutch releasing apparatus according to the present invention, relative rotation between the clutch releasing bearing means and the clutch device can effectively be prevented.

Further, in the clutch releasing apparatus according to the present invention, since the clutch releasing bearing means is removably connected to the bearing supporting means (including sleeve 9) via the separation preventing means (including bead 2a), the bearing replacing operation can be facilitated and simplified.

We claim:

1. Clutch releasing apparatus comprising:
   a clutch release bearing assembly including a clutch release bearing having an outer race, an inner race, and rolling elements arranged between said outer and inner races, and bearing holding means having a supporting member and a case holding said bearing, and
   bearing supporting means for supporting said clutch release bearing assembly about an axis of a transmission input shaft for guided movement in coaxial relationship with the input shaft to effect a clutch releasing operation,
   said bearing supporting means comprising a spring, hydraulic operating means having a hydraulic cylinder and a piston received in said cylinder for movement relative thereto along said axis, and a support sleeve supporting said bearing assembly for movement with said piston, said support sleeve having a first cylindrical portion of relatively large diameter axially displaceably fitted on said cylinder and covering said cylinder to block foreign matter from entering the bearing supporting means from between said cylinder and said sleeve, a second cylindrical portion of relatively small diameter fitted to an end of said piston and having said supporting member of said holding means fitted thereon for movement with said sleeve and said piston, and a sidewall portion joining said first and second portions of said sleeve, said spring being disposed within said sleeve between said sidewall portion and an end of said cylinder.

at least one of said supporting member and said second portion of said sleeve having separation preventing means for allowing said supporting member to be fitted over said second portion of said sleeve with a relatively small force, but necessitating a relatively large predetermined force to effect separation of said supporting member from said second portion of said sleeve.

2. Clutch releasing apparatus according to claim 1, wherein said first portion of said sleeve is non-rotatably fitted on said cylinder.

3. Clutch releasing apparatus according to claim 2, wherein means for preventing relative rotation between said supporting member and said second portion of said sleeve is provided where said supporting member is fitted to said second portion of said sleeve.

4. Clutch releasing apparatus according to claim 3, wherein said rotation preventing means includes a projecting portion provided on one of said supporting member and said second portion of said sleeve, and a recessed portion provided on the other of said supporting member and said second portion of said sleeve and engaged with said projecting portion.

5. Clutch releasing apparatus according to claim 1, wherein said second portion of said sleeve is fitted on a reduced diameter portion of said piston having a projection engaging said second portion and thereby inhibiting axial separation of said sleeve from said piston.

6. Clutch releasing apparatus comprising:
a clutch release bearing assembly including a race, and rolling elements arranged between said outer and inner races, and bearing holding means having a supporting member and a case holding said bearing, and bearing supporting means for supporting said clutch release bearing assembly about an axis of a transmission input shaft for guided movement in coaxial relationship with the input shaft to effect a clutch releasing operation, said bearing supporting means comprising hydraulic operating means having a hydraulic cylinder and a piston received in said cylinder for movement relative thereto along said axis, and a support sleeve supporting said bearing assembly for movement with said piston, said support sleeve having a first cylindrical portion of relatively large diameter axially displaceably fitted on said cylinder, a second cylindrical portion of relatively small diameter fitted on a reduced diameter end portion of said piston such that said sleeve is movable with said piston, and a sidewall portion joining said first and second cylindrical portions, said supporting member of said holding means being fitted on said second portion of said sleeve for movement therewith, said second portion of said sleeve having means restraining said supporting member thereon and inwardly flexible to permit said supporting member to be fitted on and removed from said sleeve, said restraining means permitting said supporting member to be fitted on said sleeve with a relatively small force, but necessitating a relatively large predetermined force to remove said supporting member from said sleeve.

7. Clutch releasing apparatus according to claim 6, wherein said restraining means includes a protuberance formed on said second portion of said sleeve and engaging said supporting member.

8. Clutch releasing apparatus according to claim 7, wherein said protuberance and said sidewall portion of said sleeve abut opposite axial sides of said supporting member.

9. Clutch releasing apparatus according to claim 8, wherein said sidewall portion of said sleeve is in abutment with a thick wall portion of said piston.

10. Clutch releasing apparatus according to claim 6, further comprising means cooperable with said sleeve for preventing rotation of said supporting member relative to said hydraulic cylinder.

11. Clutch releasing apparatus according to claim 10, wherein said rotation preventing means comprises first engaging configurations of said supporting member and said sleeve and second engaging configurations of said sleeve and said hydraulic operating means.

12. Clutch releasing apparatus according to claim 11, wherein said first configurations comprise a first projecting portion provided on one of said supporting member and said second cylindrical portion of said sleeve, and a first recessed portion provided on the other of said supporting member and said second cylindrical portion of said sleeve and engaged with said first projecting portion, and wherein said second configurations comprise a second projecting portion provided on one of said hydraulic cylinder and said first cylindrical portion of said sleeve, and a second recessed portion provided on the other of said hydraulic cylinder and said first cylindrical portion of said sleeve and engaged with said second projecting portion.

* * * * *